US010502540B2

(12) United States Patent
Liu et al.

(10) Patent No.: US 10,502,540 B2
(45) Date of Patent: Dec. 10, 2019

(54) WHEEL FLANGE DETECTION DEVICE

(71) Applicant: CITIC Dicastal CO., LTD, Qinhuangdao (CN)

(72) Inventors: Weidong Liu, Qinhuangdao (CN); Donghui Zhang, Qinhuangdao (CN); Dan Yao, Qinhuangdao (CN); Haiping Chang, Qinhuangdao (CN)

(73) Assignee: CITIC DICASTAL CO., LTD, Qinhuangdao, Hebei (CN)

( * ) Notice: Subject to any disclaimer, the term of this patent is extended or adjusted under 35 U.S.C. 154(b) by 217 days.

(21) Appl. No.: 15/840,652

(22) Filed: Dec. 13, 2017

(65) Prior Publication Data

US 2019/0033050 A1   Jan. 31, 2019

(30) Foreign Application Priority Data

Jul. 31, 2017  (CN) .......................... 2017 1 0635538

(51) Int. Cl.
*G01B 5/20*   (2006.01)
*G01B 5/00*   (2006.01)
*G01B 3/22*   (2006.01)

(52) U.S. Cl.
CPC ............. *G01B 5/0025* (2013.01); *G01B 3/22* (2013.01); *G01B 5/0002* (2013.01); *G01B 5/20* (2013.01)

(58) Field of Classification Search
CPC ...... G01B 5/0025; G01B 3/22; G01B 5/0002; G01B 5/20
USPC .............................................. 33/203, 203.12
See application file for complete search history.

(56) References Cited

U.S. PATENT DOCUMENTS

| 4,538,357 | A | * | 9/1985 | Dressel | G01B 5/201 33/203.18 |
| 5,653,040 | A | * | 8/1997 | Little | G01B 5/02 33/203 |
| 6,058,767 | A | * | 5/2000 | Calvin | G01M 13/04 33/517 |
| 6,453,567 | B1 | * | 9/2002 | Naruse | G01B 5/255 33/203 |
| 2019/0063896 | A1 | * | 2/2019 | Liu | G01B 7/16 |
| 2019/0162630 | A1 | * | 5/2019 | Liu | G01B 5/0025 |
| 2019/0224793 | A1 | * | 7/2019 | Liu | B23Q 3/005 |
| 2019/0224800 | A1 | * | 7/2019 | Liu | B23C 3/02 |

FOREIGN PATENT DOCUMENTS

| CN | 201378041 Y | 1/2010 |
| CN | 201680826 U | 12/2010 |

* cited by examiner

*Primary Examiner* — George B Bennett
(74) *Attorney, Agent, or Firm* — Calfee, Halter & Griswold LLP

(57) ABSTRACT

Disclosed is a wheel flange detection device. A positioning column and a linear guide rail are mounted on a flange plate, a connecting plate is connected with the linear guide rail via a guide rail sliding seat, a shaft sleeve is fixed on the connecting plate, and a dial indicator is fixed on the shaft sleeve via a lock sleeve; the upper side wall of the shaft sleeve is a conical surface, and is matched with an inner hole conical surface of the lock sleeve; threads are formed in the middle of the side wall of the shaft sleeve and matched with threads of the inner hole of the lock sleeve; 12 groups of vertical slots are formed in the upper side wall of the shaft sleeve.

4 Claims, 4 Drawing Sheets

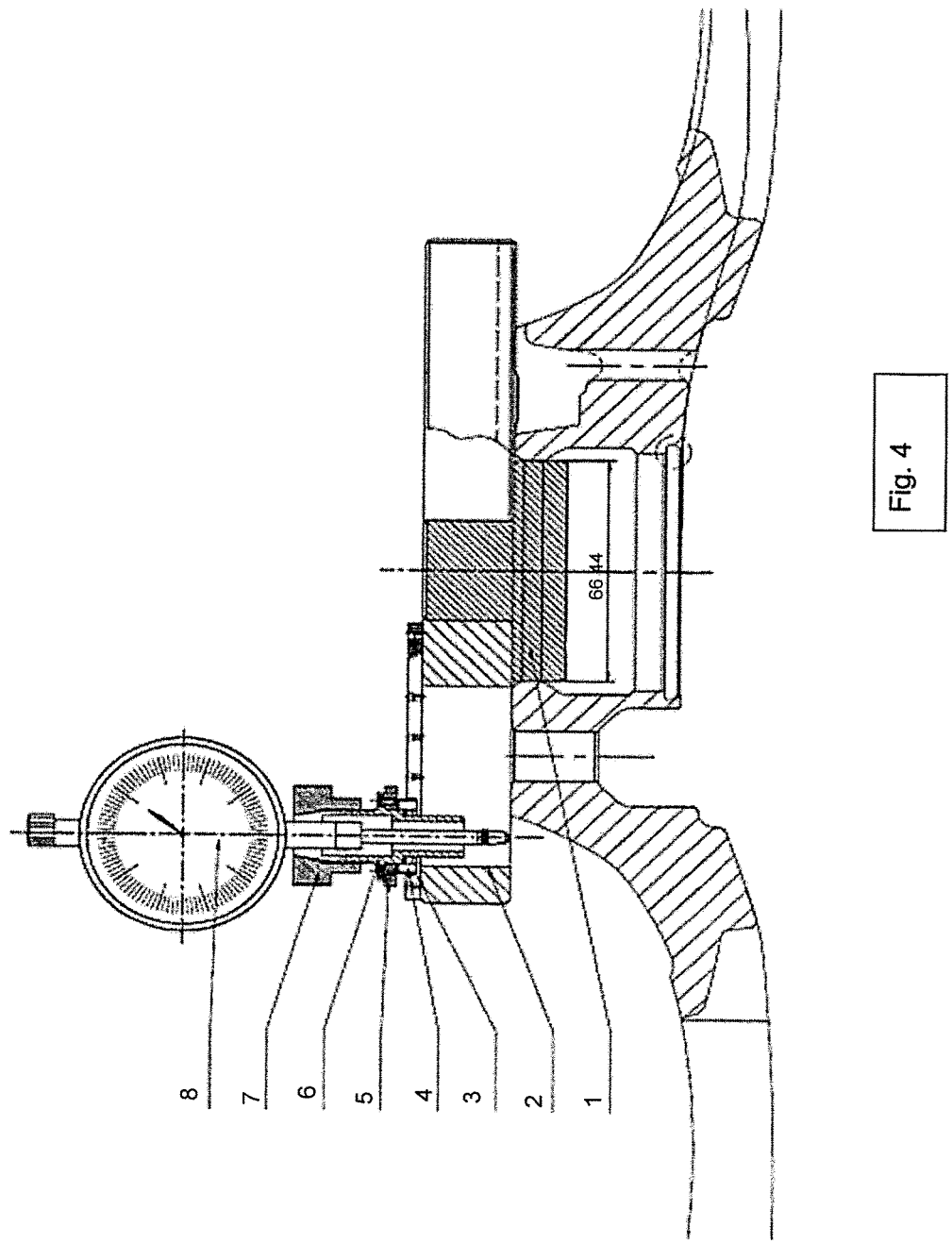

WHEEL FLANGE DETECTION DEVICE

CROSS-REFERENCE TO RELATED APPLICATIONS

This application claims priority to Chinese Patent Application No. 201710635538.3, filed on Jul. 31, 2017, which is hereby incorporated by reference in its entirety.

TECHNICAL FIELD

The present application relates to a detection device, specifically to a detection tool for detecting the convex-concave degree of a wheel flange.

BACKGROUND ART

In the production industry of automobile wheels, in order to guarantee the assembly firmness of a wheel, the flange surface of the wheel is designed into a concave structure, and this structure increases the pre-tightening force of a bolt and improves the safety performance of the wheel on the premise that a wheel flange is completely fitted with a main shaft of an automobile.

SUMMARY OF THE INVENTION

The present application is aimed at providing a wheel flange detection device.

A wheel flange detection device in the present application comprises a positioning column, a flange plate, a linear guide rail, a guide rail sliding seat, a connecting plate, a shaft sleeve, a lock sleeve and a dial indicator, wherein the positioning column and the linear guide rail are mounted on the flange plate, the connecting plate is connected with the linear guide rail via the guide rail sliding seat, the shaft sleeve is fixed on the connecting plate, and the dial indicator is fixed on the shaft sleeve via the lock sleeve. The upper side wall of the shaft sleeve is a conical surface, and is matched with an inner hole conical surface of the lock sleeve; threads are formed in the middle of the side wall of the shaft sleeve and matched with threads of the inner hole of the lock sleeve; and 12 groups of vertical slots are formed in the upper side wall of the shaft sleeve. When the lock sleeve locks the dial indicator, the lock sleeve moves down relatively to the shaft sleeve via threaded fit between the shaft sleeve and the lock sleeve, the conical surface of the lock sleeve extrudes the conical surface of the shaft sleeve, and the inner hole at the vertical slots of the shaft sleeve contracts to lock the dial indicator.

In actual use, the positioning column of this device is inserted into the central hole of a wheel, meanwhile, the flange plate is fitted with the flange of the wheel, the dial indicator is moved to one side of the linear guide rail, the value of the dial indicator is read, then the dial indicator is slowly slid to the other side along the linear guide rail, the reading change of the dial indicator is observed at the same time, and the maximum change value of the dial indicator is finally obtained. And the maximum change value is compared with the convex-concave degree of the wheel, then determining whether the wheel flange is qualified.

The present application may meet the requirement for high-precision turnover in use, and has the characteristics of simple structure, reliable operation, high turnover precision and the like.

BRIEF DESCRIPTION OF DRAWINGS

FIG. 4 a structural schematic diagram when the wheel flange detection device of the present application works.

Figure 1:
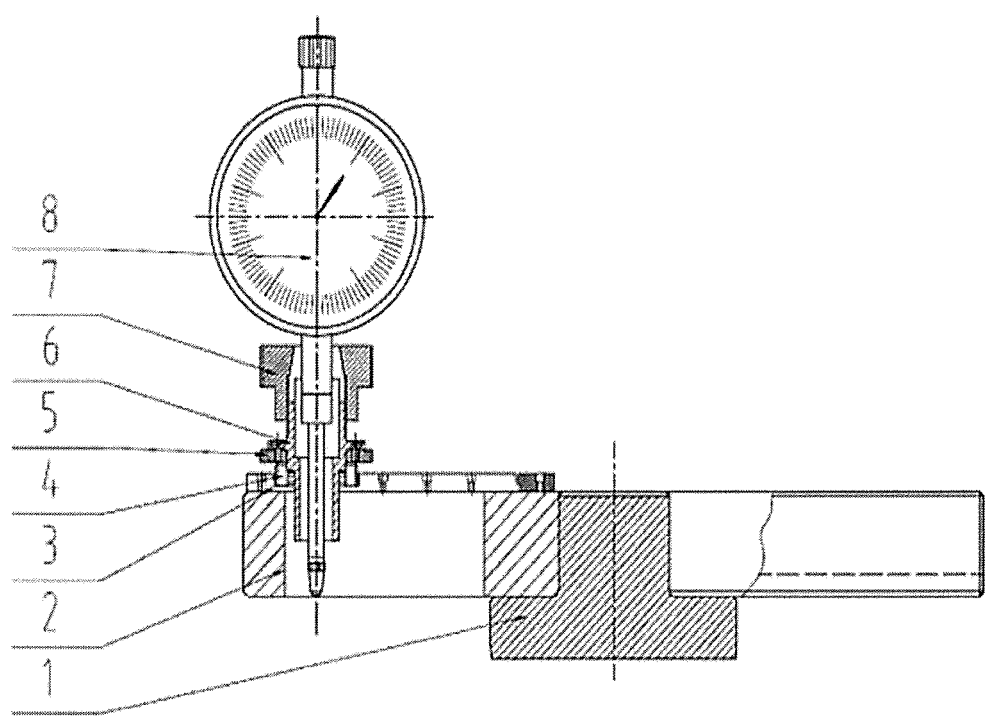
FIG. 1 is a structural schematic diagram of a wheel flange detection device of the present application.
Figure 2:
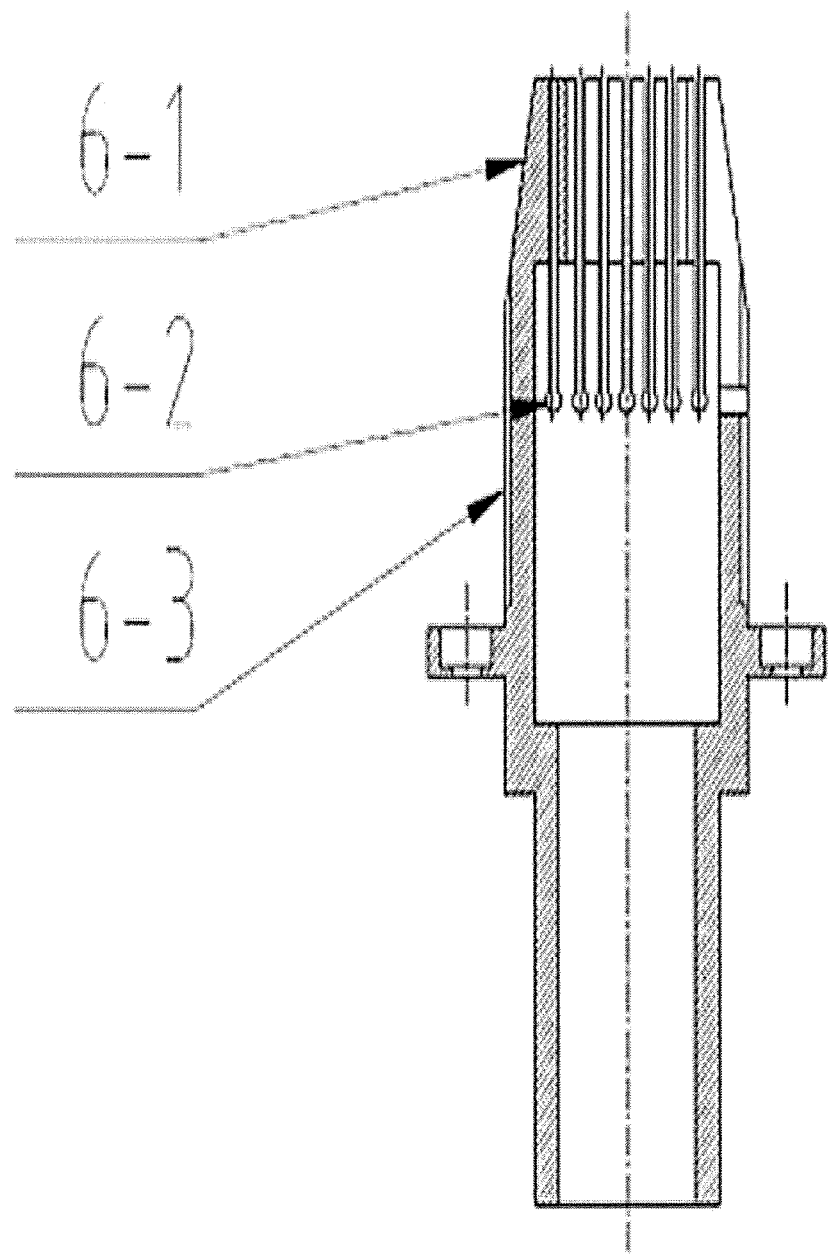
FIG. 2 is a structural schematic diagram of a shaft sleeve in the wheel flange detection device of the present application.
Figure 3:
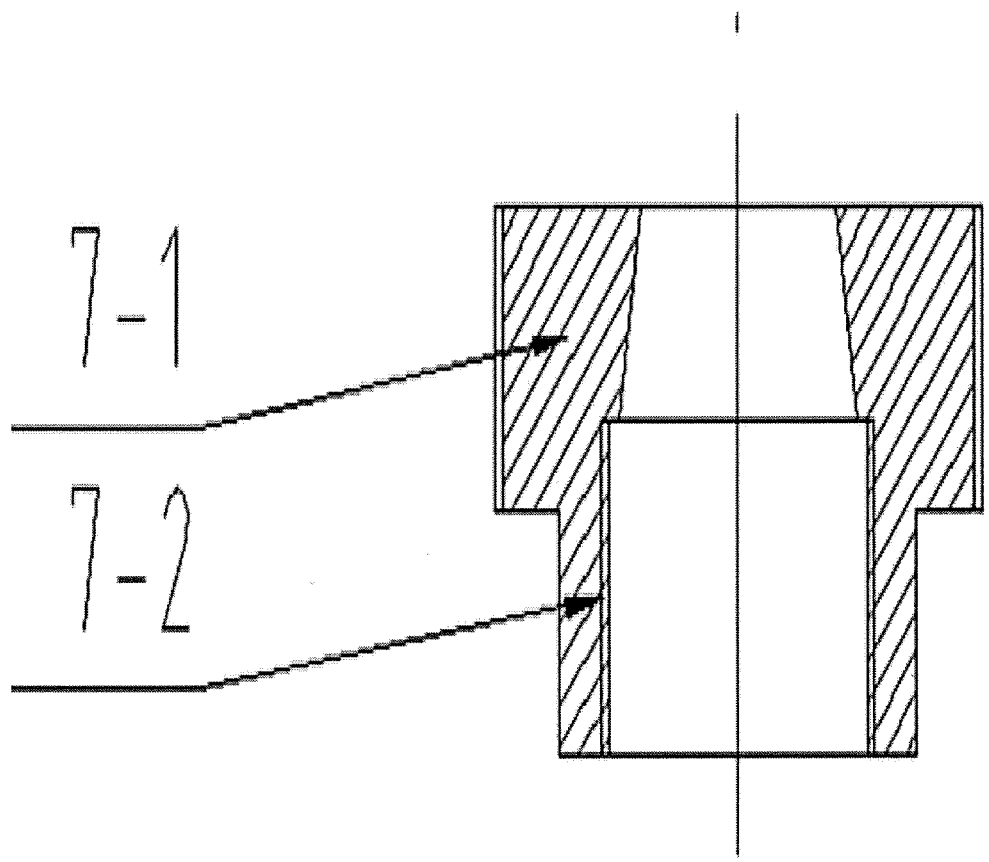
FIG. 3 is a structural schematic diagram of a lock sleeve in the wheel flange detection device of the present application.

In figures: 1-positioning column, 2-flange plate, 3-linear guide rail, 4-guide rail sliding seat, 5-connecting plate, 6-shaft sleeve, 7-lock sleeve, 8-dial indicator, 6-1-conical surface, 6-2-vertical slot, 6-3-shaft sleeve thread, 7-1-inner hole conical surface, 7-2-lock sleeve thread.

DETAILED DESCRIPTION OF THE INVENTION

Details and working conditions of a specific device provided by the present application will be described in detail below in combination with the accompanying drawings.

A wheel flange detection device in the present application comprises a positioning column 1, a flange plate 2, a linear guide rail 3, a guide rail sliding seat 4, a connecting plate 5, a shaft sleeve 6, a lock sleeve 7 and a dial indicator 8, wherein the positioning column 1 and the linear guide rail 3 are mounted on the flange plate 2, the connecting plate 5 is connected with the linear guide rail 3 via the guide rail sliding seat 4, the shaft sleeve 6 is fixed on the connecting plate 5, and the dial indicator 8 is fixed on the shaft sleeve 6 via the lock sleeve 7. The upper side wall of the shaft sleeve 6 is a conical surface 6-1, and is matched with an inner hole conical surface 7-1 of the lock sleeve 7; threads 6-3 are formed in the middle of the side wall of the shaft sleeve 6 and matched with threads 7-2 of the inner hole of the lock sleeve 7; and 12 groups of vertical slots 6-2 are formed in the upper side wall of the shaft sleeve 6. When the lock sleeve 7 locks the dial indicator 8, the lock sleeve 7 moves down relatively to the shaft sleeve 6 via threaded fit between the shaft sleeve 6 and the lock sleeve 7. The conical surface 7-1 of the lock sleeve 7 extrudes the conical surface 6-1 of the shaft sleeve 6, and the inner hole at the vertical slots of the shaft sleeve 6 contracts to lock the dial indicator 8.

In actual use, the positioning column 1 of this device is inserted into the central hole of a wheel, meanwhile, the flange plate 2 is fitted with the flange of the wheel, the dial indicator 8 is moved to one side of the linear guide rail 3, the value of the dial indicator 8 is read, then the dial indicator 8 is slowly slid to the other side along the linear guide rail 3, the reading change of the dial indicator 8 is observed at the same time, and the maximum change value of the dial indicator 8 is finally obtained. And the maximum change value is compared with the convex-concave degree of the wheel, then to determining whether the wheel flange is qualified.

The foregoing descriptions of specific exemplary embodiments of the present application have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A wheel flange detection device, comprising a positioning column, a flange plate, a linear guide rail, a guide rail sliding seat, a connecting plate, a shaft sleeve, a lock sleeve and a dial indicator, wherein the positioning column and the linear guide rail are mounted on the flange plate, the connecting plate is connected with the linear guide rail via the guide rail sliding seat, the shaft sleeve is fixed on the connecting plate, and the dial indicator is fixed on the shaft sleeve via the lock sleeve.

2. The wheel flange detection device of claim 1, wherein the upper side wall of the shaft sleeve is a conical surface, and the conical surface is matched with an inner hole conical surface of the lock sleeve.

3. The wheel flange detection device of claim 1, wherein threads are formed in the middle of the side wall of the shaft sleeve and the threads are matched with threads of the inner hole of the lock sleeve.

4. The wheel flange detection device of claim 1, wherein 12 groups of vertical slots are formed in the upper side wall of the shaft sleeve; and when the lock sleeve locks the dial indicator, the lock sleeve moves down relatively to the shaft sleeve via threaded fit between the shaft sleeve, and the lock sleeve, the conical surface of the lock sleeve extrudes the conical surface of the shaft sleeve, and the inner hole at the vertical slots of the shaft sleeve contracts to lock the dial indicator.

* * * * *